(12) United States Patent
Barnes et al.

(10) Patent No.: US 11,790,435 B2
(45) Date of Patent: *Oct. 17, 2023

(54) DYNAMIC COMPUTER MARKETPLACE SYSTEM AND METHOD

(71) Applicant: Advanced Micro Devices, Inc., Santa Clara, CA (US)

(72) Inventors: Jesse Barnes, Sebastopol, CA (US); Max Alt, San Francisco, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/239,537

(22) Filed: Apr. 23, 2021

(65) Prior Publication Data

US 2021/0241360 A1 Aug. 5, 2021

Related U.S. Application Data

(63) Continuation of application No. 16/185,563, filed on Nov. 9, 2018, now Pat. No. 11,017,455.

(60) Provisional application No. 62/584,269, filed on Nov. 10, 2017.

(51) Int. Cl.
*G06Q 30/00* (2023.01)
*G06Q 30/0601* (2023.01)
*G06F 9/50* (2006.01)
*G06Q 30/06* (2023.01)

(52) U.S. Cl.
CPC ....... *G06Q 30/0639* (2013.01); *G06F 9/5022* (2013.01); *G06Q 30/06* (2013.01); *G06Q 30/0601* (2013.01); *G06Q 30/0641* (2013.01)

(58) Field of Classification Search
CPC ...... G06Q 30/0601–0645; G06Q 30/08; G06F 9/5022
USPC ................................................ 705/26.1–27.2
See application file for complete search history.

(56) References Cited

U.S. PATENT DOCUMENTS

| | | | |
|---|---|---|---|
| 2013/0031028 A1* | 1/2013 | Martin | G06Q 30/08 705/400 |
| 2015/0193862 A1* | 7/2015 | Luft | G06Q 30/0639 705/27.1 |
| 2016/0019636 A1* | 1/2016 | Adapalli | H04L 47/70 705/26.81 |

(Continued)

OTHER PUBLICATIONS

Kure, Marcin, 4 Ways to Make Money Selling Cloud, Nov. 18, 2014, Linkedin.com, accessed at [https://www.linkedin.com/pulse/20141118060644-2702935-4-ways-to-make-money-selling-cloud] (Year: 2014).*

(Continued)

*Primary Examiner* — Michael Misiaszek
*Assistant Examiner* — Lindsey B Smith
(74) *Attorney, Agent, or Firm* — Fishman Stewart PLLC

(57) ABSTRACT

Systems, methods and apparatuses are disclosed for implementation and management of a dynamic compute and application marketplace. The dynamic computer marketplace system can coordinate access to one or more other computing resources, including on-premises computing resources, external (or off-premises) computing resources or a combination thereof. In various embodiments, the dynamic computer marketplace system advantageously can be used to facilitate inter-provider migration, transparent pricing, and/or competitive pricing, among other things.

18 Claims, 1 Drawing Sheet

(56) References Cited

U.S. PATENT DOCUMENTS

2017/0206594 A1* 7/2017 Stausholm .......... G06Q 30/0641
2018/0060395 A1* 3/2018 Pathak ................ H04L 67/1008
2018/0173567 A1* 6/2018 Olshefski .................. G06F 9/50

OTHER PUBLICATIONS

Henschen, Doug, "IBM Cloud Market: One-Stop Cloud Shop", informationweek.com, accessed at [https://www.informationweek.com/cloud/software-as-a-service/ibm-cloud-market-one-stop-cloud-shop/d/d-id/1234917] (Year: 2014).

* cited by examiner

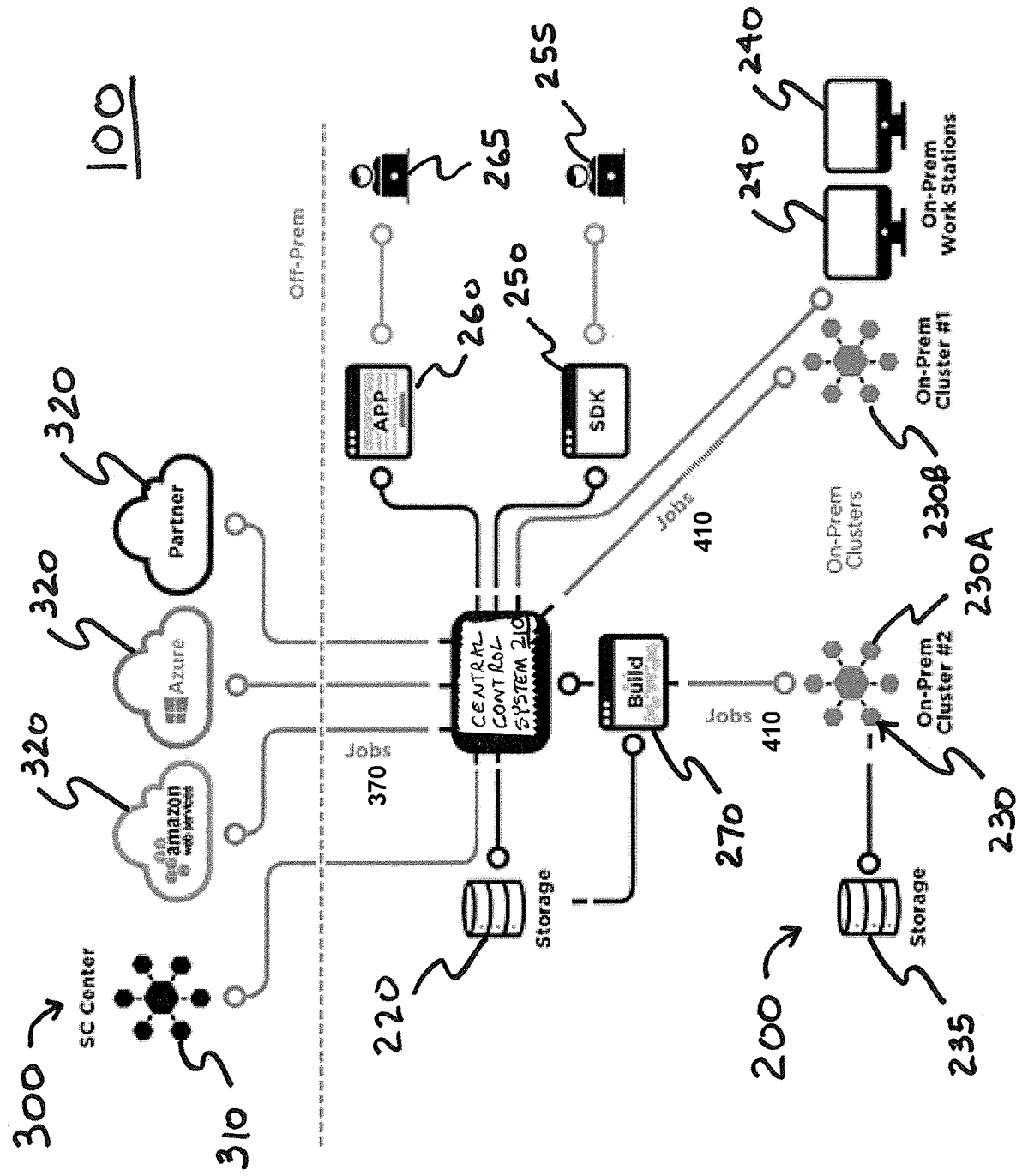

DYNAMIC COMPUTER MARKETPLACE SYSTEM AND METHOD

CROSS-REFERENCE TO RELATED APPLICATIONS

This application claims the benefit of, and priority to, U.S. Provisional Application Ser. No. 62/584,269, filed Nov. 10, 2017, the disclosure of which is hereby incorporated herein by reference in its entirety and for all purposes.

FIELD

This specification relates generally to dynamic cloud platforms, resource aggregation (such as compute capability, storage, and/or network provisioning), and management of computer application code, including systems, apparatuses and methods for making and using the same.

The systems, apparatuses and methods disclosed herein describe particular embodiments, such as those including economic models of supply and demand, commodity pricing, and futures, and are not intended to be exhaustive of the contemplated configurations and processes.

BACKGROUND

In traditional marketplaces, users typically choose a permanent or semi-permanent cloud service provider or compute service provider. Pricing can be difficult to discover and predict, and moving between cloud service or compute service providers can be inefficient or otherwise difficult.

For example, pricing is often obfuscated due to multiple configuration options, making direct comparison between providers very difficult. As such, users may opt to stay with a chosen provider regardless of pricing changes or other issues, due to the uncertainty and high overhead and cost of switching to another provider.

There exists a need for simplifying the management and operation of computer marketplaces, including the selection process and movement among multiple cloud service providers or compute service providers.

SUMMARY

This specification describes new technologies relating to compute and application marketplaces. According to various principles and embodiments discussed herein, a platform can provide, for example, a public marketplace of cloud and/or compute providers along with an application marketplace comprised of proprietary, pay-per-use applications as well as open source and other free applications.

The principles described herein provide for a platform that allows for easy inter-provider migration, competitive pricing based on a common set of configuration options, and clear and transparent application pricing, among other things. According to various embodiments, for example, the platform can provide unified pricing units (currency) for compute, storage, and networking capability, thereby making comparison simpler and more efficient.

BRIEF DESCRIPTION OF THE DRAWING

The FIGURE illustrates an exemplary embodiment of a dynamic computer marketplace system.

It should be noted that the FIGURE is not drawn to scale and that elements of similar structures or functions are generally represented by like reference numerals for illustrative purposes throughout the FIGURE. It also should be noted that the FIGURE is only intended to facilitate the description of the preferred embodiments. The FIGURE does not illustrate every aspect of the described embodiments and does not limit the scope of the present disclosure.

DETAILED DESCRIPTION OF THE PREFERRED EMBODIMENTS

Systems, apparatuses and methods are provided for implementing and maintaining a dynamic computer marketplace. In other words, the principles set forth herein are primarily directed to marketplace concepts and deployment of a dynamic computer marketplace. According to various embodiments, the dynamic computer marketplace systems, apparatuses and methods include, or are operated in accordance with, one or more of the following attributes.

First, currency units can be made available and used for, among other things, compute, storage, and/or network capability. The currency units, for example, can be based on common metrics, such as execution time for a selected benchmark for compute; size, input/output operations per second (or IOPs), and bandwidth for storage and/or bandwidth and latency for networking.

Second, a platform can be provided for aggregating compute resources (both service and batch-based resources). For example, this platform can be of the type disclosed in the commonly-owned U.S. Provisional Patent Application Ser. No. 62/584,274, entitled "Dynamic Network of Supercomputing Resources with Unified Management Interface," filed Nov. 10, 2017, and co-pending United States Nonprovisional Patent Application, entitled "Dynamic Network of Supercomputing Resources with Unified Management Interface," filed on the same date herewith, which patent applications are assigned to the assignee of the present patent application and the respective disclosures of which are hereby incorporated herein by reference in their entireties and for all purposes.

Third, a platform can be provided for the listing and possible sale of applications. For example, vendors may choose to charge per-use, by configuration used, by the hour, or other metrics.

Fourth, the marketplace can be configured for the purchase and sale of currency units, and for management of account balances.

The FIGURE illustrates an exemplary embodiment of a dynamic computer marketplace system 100 in accordance with various embodiments. Turning to the FIGURE, the dynamic computer marketplace system 100 is shown as including a plurality of computing resources. The system resources can include a central control system 210 for coordinating access to one or more other computing resources. The central control system 210 can be provided in any conventional manner and can include one or more hardware components, such as a computer system and/or a server system, and/or one or more software components, such as a software module. As shown in the FIGURE, for example, the central control system 210 can communicate with at least one storage device 220. Each storage device 220 can be separate from, and/or at least partially integrated with, the central control system 210.

As illustrated in the FIGURE, the central control system 210 can coordinate access to one or more other computing resources residing at a particular site or other selected geographic location 200. The computing resources can be disposed at geographic locations 200 that are proximal to, and/or distal from, a location of the central control system 210. In selected embodiments, the central control system 210 can coordinate access to one or more clusters 230A, 230B and/or workstations 240 residing at a particular site. Each cluster 230, such as cluster 230A, can be associated with one or more storage devices 235. The central control system 210 can be configured to exchange jobs 270 with the clusters 230 and/or the workstations 240. The jobs 410 can be exchanged directly, and/or indirectly via a job build device 270, with the clusters 230 and/or the workstations 240.

Additionally and/or alternatively, the central control system 210 can coordinate access to one or more external computing resources. Stated somewhat differently, the external computing resources can be disposed at geographic locations 300 that are remote (or external) from the central control system 210. Exemplary external computing resources can include, but are not limited to, supercomputer centers 310 and/or cloud providers 320. As illustrated in the FIGURE, for example, the cloud providers 320 can include cloud computing services provided by Amazon Web Services, Inc., Microsoft Azure developed by Microsoft Corporation and/or another partner. As shown in the FIGURE, the central control system 210 can be configured to exchange jobs 370 with one or more of the external computing resources.

The central control system 210 advantageously can provide a central marketplace for users to purchase resources, such as a software developer's kit (or SDK) 250, that may be made available by providers 255 and/or applications 260 that may be made available from independent software vendors (ISVs) 265 and/or packaged by other users. In the manner set forth above, an exemplary platform for aggregating the diverse set of the computing resources as illustrated in the FIGURE is set forth in the commonly-owned U.S. Provisional Patent Application Ser. No. 62/584,274, entitled "Dynamic Network of Supercomputing Resources with Unified Management Interface," filed Nov. 10, 2017, and co-pending United States Nonprovisional Patent Application, entitled "Dynamic Network of Supercomputing Resources with Unified Management Interface," filed on the same date herewith, which patent applications are assigned to the assignee of the present patent application and the respective disclosures of which have been incorporated herein by reference in their entireties and for all purposes.

The dynamic computer marketplace system 100 advantageously can offer various benefits of a marketplace as disclosed herein. Unlike various conventional marketplaces, the dynamic computer marketplace system 100 can offer a dynamic environment that allows one or more participants, who can enter, remain in and/or exit the marketplace in a random manner, to purchase, sell, and/or re-price computing resources. In selected embodiments, the computing resources can include computing resources of one or more various types. Exemplary types of computing resources can include computing time, software, and other resources such as networking and storage, without limitation. In the case of a public implementation of the dynamic computer marketplace system 100, for example, the principles described herein can reduce and/or eliminate barriers to entry by new participants wanting to monetize their computing resources and/or purchase computing resources from others.

Among other things, for example, providers of compute services and/or applications can have access to pricing and other information available from their competitors and have an option to adjust pricing and other terms for their compute services and/or applications based on the competitor information, demand and/or desired utilization rates. Additionally, the use of currency can allow creation of a self-sustaining market for an exchange and/or storage of capability, allowing for a commodities market of sorts, complete with futures and speculation.

Although various implementations are discussed herein and shown in the FIGURE, it will be understood that the principles described herein are not limited to such. For example, while particular scenarios are referenced, it will be understood that the principles described herein apply to any suitable resource or provider, including but not limited to public and private cloud platforms, data centers or intracompany platforms, any suitable form or type of resource aggregation (e.g., compute capability, storage, and network provisioning), and any suitable offering, such as computer application code.

Accordingly, although particular embodiments have been described above and shown in the diagram, the principles described herein can be applied to different types of marketplace solutions. Certain embodiments have been described for the purpose of simplifying the description and are present for purposes of illustration only. It will also be understood that reference to a "device," "server" or other hardware or software terms herein can refer to any other type of suitable device, component, software, and so on. Moreover, the principles discussed herein can be generalized to any number and configuration of devices and protocols, and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments of the present disclosure.

What is claimed is:

1. A dynamic supply and demand computer marketplace system, comprising:
    a central control system comprising at least one computer, the central control system being configured to:
        implement a dynamic supply and demand computer marketplace to include at least futures and commodity pricing for a plurality of computing resource capabilities, wherein at least one of the plurality of computing resource capabilities includes a capability measured in execution time for a selected benchmark for compute;
        coordinate access to a plurality of providers each providing access to at least one computing resource capability from the plurality of computing resource capabilities, wherein each of the plurality of providers are disposed at geographically distinct locations;
        allow each of the plurality of computing resource capabilities to be purchased, sold, and exchanged, wherein at least one of the plurality of computing resource capabilities is presentable as a commodity and futures;
        allow a user, from a plurality of users, to re-price at least one purchased computing resource capability, wherein the at least one purchased computing resource capability was purchased from a first provider of the plurality of providers;
        offer, by the user, the at least one re-priced purchased computing resource capability on the dynamic supply and demand computer marketplace;
        based on the offered re-priced purchased computing resource capability, provide an option to the first provider to adjust pricing to the computing resource capability purchased by the user;

make one or more currency units available for the plurality of computing resource capabilities such that at least one computing resource capability of the plurality of computing resource capabilities are purchased, sold, and exchanged using the one or more currency units, wherein at least one of the one or more currency units comprises one of a first currency unit based on input/output operations per second (IOPS) and a second currency unit based on latency for networking; and a computer network for enabling communication between the central control system and the plurality of computing resource capabilities, wherein the central control system maintains the dynamic supply and demand computer marketplace.

2. The dynamic computer marketplace system of claim 1, the central control system being further configured to provide, on the dynamic supply and demand computer marketplace, at least one provider, from the plurality of providers, accesses to information including pricing, demand, utilization rates, and terms of the plurality of computing resource capabilities for sale on the dynamic supply and demand computer marketplace, including competitor information, and provide the at least one provider an option to adjust pricing for at least one of the plurality of computing resource capabilities based on the competitor information.

3. The dynamic computer marketplace system of claim 1, wherein another of the one or more currency units is based upon one or more common metrics selected from a group consisting of an execution time for a selected benchmark for compute, size, and bandwidth for storage.

4. The dynamic computer marketplace system of claim 1, wherein the central control system is configured for facilitating a purchase of the one or more currency units, a sale of the one or more currency units, or a combination thereof.

5. The dynamic computer marketplace system of claim 1, wherein the plurality of computing resource capabilities is offered for purchase on a per-use basis, a configuration-used basis, or an hourly basis.

6. The dynamic computer marketplace system of claim 1, wherein the central control system provides a listing of available computing resource capabilities for presentation, and wherein the at least one computer includes a server.

7. The dynamic computer marketplace system of claim 1, wherein the dynamic supply and demand computer marketplace system provides migration between providers among the plurality of providers.

8. The dynamic computer marketplace system of claim 1, wherein the plurality of computing resource capabilities include at least a storage capability, a network capability, a capability of software access, and a capability of computing resource access.

9. The dynamic computer marketplace system of claim 8, wherein the plurality of computing resource capabilities is offered for purchase on a per-use basis, a configuration-used basis, or an hourly basis.

10. The dynamic computer marketplace system of claim 1, the central control system being further configured to offer for purchase a plurality of software developer kits from the plurality of providers.

11. The dynamic computer marketplace system of claim 10, the central control system being further configured to offer for purchase a plurality of applications from the plurality of providers.

12. A dynamic supply and demand computer marketplace method carried out by a central control system comprising at least one computer, the method comprising:

implementing a dynamic supply and demand computer marketplace to include at least futures and commodity pricing for a plurality of computing resource capabilities, wherein at least one of the plurality of computing resource capabilities includes a capability measured in execution time for a selected benchmark for compute;

enabling communication among the central control system and the plurality of computing resources, wherein each of the plurality of computing resources are controlled by a respective provider from a plurality of providers, and wherein each of the plurality of computing resources include access to at least one of the plurality of computing resource capabilities;

allowing, via the central control system, each of the plurality of computing resource capabilities to be purchased, sold, and exchanged, wherein at least one of the plurality of computing resource capabilities is presentable as a commodity and futures;

re-pricing by a user, via the central control system, at least one computing resource capability of the plurality of computing resource capabilities, wherein the at least one computing resource capability was purchased by the user from a first provider of the plurality of providers;

offering, via the central control system, the re-priced purchased computing resource capability on the dynamic supply and demand computer marketplace;

based on the offered re-priced purchased computing resource capability, providing an option, via the central control system, to the first provider to adjust pricing to at least one of the plurality of computing resource capabilities offered by the first provider;

making one or more currency units available, via the central control system having the at least one computer, for a purchase, sale, and exchange of at least one computing resource capability, wherein the one or more currency units comprise at least one of a first currency unit based on input/output operations per second (IOPS) and a second currency unit based on latency for networking; and maintaining the dynamic supply and demand computer marketplace via the central control system having the at least one computer.

13. The method of claim 12, wherein the plurality of computing resource capabilities includes at least a storage capability, a network capability, a capability of software access, and a capability of computing resource access, wherein the at least one computer includes a server.

14. The method of claim 12, further comprising providing at least one provider from the plurality of providers, by the dynamic supply and demand computer marketplace, access to information including pricing, demand, utilization rates, and terms of the plurality of computing resource capabilities for sale on the dynamic supply and demand computer marketplace, including competitor information, and providing the at least one provider an option to adjust pricing for at least one of the plurality of computing resource capabilities based on the competitor information.

15. The method of claim 14, further comprising providing migration between providers of the plurality of providers.

16. The method of claim 12, wherein the re-priced purchased computing resource capability is offered as a futures.

17. The method of claim 16, wherein the plurality of providers include cloud providers.

18. The method of claim 16, further comprising facilitating a purchase of the currency units, a sale of the currency units, or a combination thereof.

\* \* \* \* \*